(12) United States Patent
Akimoto et al.

(10) Patent No.: US 10,688,886 B2
(45) Date of Patent: Jun. 23, 2020

(54) VEHICLE SEAT AND SEAT OPERATIONS SECTION

(71) Applicant: TACHI-S CO., LTD., Akishima-shi, Tokyo (JP)

(72) Inventors: Norito Akimoto, Tokyo (JP); Masaaki Honda, Tokyo (JP)

(73) Assignee: TACHI-S CO., LTD., Tokyo (JP)

( * ) Notice: Subject to any disclaimer, the term of this patent is extended or adjusted under 35 U.S.C. 154(b) by 110 days.

(21) Appl. No.: 15/953,470

(22) Filed: Apr. 15, 2018

(65) Prior Publication Data
US 2018/0345824 A1 Dec. 6, 2018

(30) Foreign Application Priority Data

Jun. 5, 2017 (JP) .................. 2017-110561

(51) Int. Cl.
| | |
|---|---|
| *F16C 1/12* | (2006.01) |
| *G05G 1/04* | (2006.01) |
| *B60N 2/14* | (2006.01) |
| *B60N 2/06* | (2006.01) |
| *B60N 2/22* | (2006.01) |

(52) U.S. Cl.
CPC ............... *B60N 2/06* (2013.01); *B60N 2/14* (2013.01); *B60N 2/22* (2013.01); *F16C 1/12* (2013.01); *G05G 1/04* (2013.01)

(58) Field of Classification Search
CPC .. G05G 1/01; G05G 1/02; G05G 1/04; G05G 1/62; G05G 1/06; F16C 1/14; F16C 1/10; F16C 1/18; F16C 1/102; F16C 1/106; F16C 1/103; F16C 1/12; A47C 1/0345; A47C 1/0342; B60N 2/12; B60N 2/14; B60N 2/20; B60N 2/146
See application file for complete search history.

(56) References Cited

U.S. PATENT DOCUMENTS

| | | | | |
|---|---|---|---|---|
| 5,307,707 A | * | 5/1994 | Roelle ................ | A47C 1/024 297/354.1 |
| 5,794,994 A | * | 8/1998 | Miyagawa .......... | E05B 85/12 292/336.3 |
| 6,988,752 B2 | * | 1/2006 | Belchine, III ...... | E05B 85/12 16/266 |
| 7,472,963 B2 | * | 1/2009 | Jeong ................. | B60N 2/0296 297/463.1 |
| 7,828,382 B2 | * | 11/2010 | Ozeki ................. | B60N 2/20 297/341 |
| 7,959,230 B2 | * | 6/2011 | Hentges ............. | B60N 2/3011 297/378.12 |
| 8,621,956 B2 | * | 1/2014 | Simeonidis ........ | B60N 2/123 297/378.13 |

(Continued)

FOREIGN PATENT DOCUMENTS

JP     2007-186105 A     7/2007

*Primary Examiner* — Timothy J Brindley
(74) *Attorney, Agent, or Firm* — SGPatents PLLC

(57) ABSTRACT

The vehicle seat includes a seat cushion and a seat back. The seat back includes one shaft member, a mount frame having a first bearing and a second bearing, and a first operation section and a second operation section which are arranged side by side. The shaft member is attached to the first and the second bearings, having no fixing section for the mount frame between the first and the second bearings, and serving as a center around which the first and the second operation sections are rotated.

8 Claims, 7 Drawing Sheets

(56) References Cited

U.S. PATENT DOCUMENTS

| | | | | |
|---|---|---|---|---|
| 8,727,401 B2* | 5/2014 | Tanaka | ............... | E05B 85/12 |
| | | | | 292/336.3 |
| 2007/0046091 A1* | 3/2007 | Day | ............... | B60N 2/0296 |
| | | | | 297/378.12 |
| 2007/0062324 A1* | 3/2007 | Ingraham | ............... | B60N 2/3011 |
| | | | | 74/506 |
| 2007/0296257 A1* | 12/2007 | Nathan | ............... | B60N 2/206 |
| | | | | 297/325 |
| 2010/0244524 A1* | 9/2010 | Kumazaki | ............... | B60N 2/12 |
| | | | | 297/341 |
| 2011/0031775 A1* | 2/2011 | Clor | ............... | B60N 2/3011 |
| | | | | 296/66 |
| 2012/0038190 A1* | 2/2012 | Runde | ............... | B60N 2/856 |
| | | | | 297/183.1 |
| 2013/0088022 A1* | 4/2013 | Collado | ............... | E05B 85/12 |
| | | | | 292/336.3 |
| 2013/0200678 A1* | 8/2013 | Hirokawa | ............... | B60N 2/0296 |
| | | | | 297/378.13 |
| 2013/0320736 A1* | 12/2013 | Teufel | ............... | B60N 2/366 |
| | | | | 297/383 |
| 2014/0110986 A1* | 4/2014 | Yamaguchi | ............... | B60N 2/68 |
| | | | | 297/378.1 |
| 2014/0284974 A1* | 9/2014 | Boy | ............... | B60N 2/2245 |
| | | | | 297/217.1 |
| 2016/0107553 A1* | 4/2016 | Imajo | ............... | B60N 2/68 |
| | | | | 297/452.18 |
| 2017/0151899 A1* | 6/2017 | Uehara | ............... | B60N 2/6671 |
| 2017/0203676 A1* | 7/2017 | Dunn | ............... | B60N 2/933 |
| 2018/0186259 A1* | 7/2018 | Line | ............... | B60N 2/882 |
| 2018/0281632 A1* | 10/2018 | Tindall | ............... | B60N 2/0296 |
| 2019/0031068 A1* | 1/2019 | Pasternak | ............... | B60N 2/20 |
| 2019/0160979 A1* | 5/2019 | Maresky | ............... | B60N 2/3086 |

\* cited by examiner

VEHICLE SEAT AND SEAT OPERATIONS SECTION

CLAIM OF PRIORITY

The present application claims priority from Japanese Patent Application JP2017-110561 filed on Jun. 5, 2017, the content of which are hereby incorporated by reference into this application.

BACKGROUND OF THE INVENTION

The present invention relates to a vehicle seat and a seat operation section. Specifically, the present invention is applicable to the vehicle seat having the seat operation section disposed on the back surface of the seat.

The seat operation section of the vehicle seat includes a mechanism (sliding mechanism) that allows a positional adjustment of a seat body in the front-to-rear direction, and a mechanism (reclining mechanism) that allows adjustment of an angle formed between the seat cushion that constitutes the seat surface and a seatback that constitutes the backrest.

Japanese Unexamined Patent Application No. 2007-186105 discloses the vehicle seat having a plurality of operation members disposed on the backside of the seat back.

SUMMARY

Studies on the vehicle seat having a plurality of horizontally arranged seat operation sections (levers) disposed on the back surface of the seat back have revealed the needs of improvement in the appearance of the seat operation section by reducing the entire arrangement area of the plurality of seat operation sections while keeping operability of the respective seat operation sections (without changing each size of the levers). In order to satisfy the needs, the interval between adjacent seat operation sections which are arranged side by side has to be reduced.

It is an object of the present invention to provide a vehicle seat having a seat operation section with good appearance.

The other problems and new characteristics will be clarified by the description and drawings of the present invention as described below.

The present invention will be briefly explained as a typical example as below.

The vehicle seat includes a seat cushion and a seat back. The seat back includes a seat operation section disposed on a back surface of the seat back. The seat operation section includes one shaft member, a mount frame having a first bearing and a second bearing, and a first operation section and a second operation section which are arranged side by side. The shaft member is attached to the first bearing and the second bearing, having no fixing section for the mount frame between the first bearing and the second bearing, and serving as a center around which the first operation section and the second operation section are rotated.

The prevent invention provides the vehicle seat having the seat operation section with good appearance.

BRIEF DESCRIPTION OF THE DRAWINGS

FIG. 11A is a perspective view of the enlarged upper section of FIG. 10. FIG. 11B is an enlarged view of a bearing 1621. FIG. 11C is an enlarged view of a right surface 161R, and a left surface 161L. FIG. 11D is an enlarged view of a bearing 1611.

DETAILED DESCRIPTION OF THE PREFERRED EMBODIMENT

Figure 1:
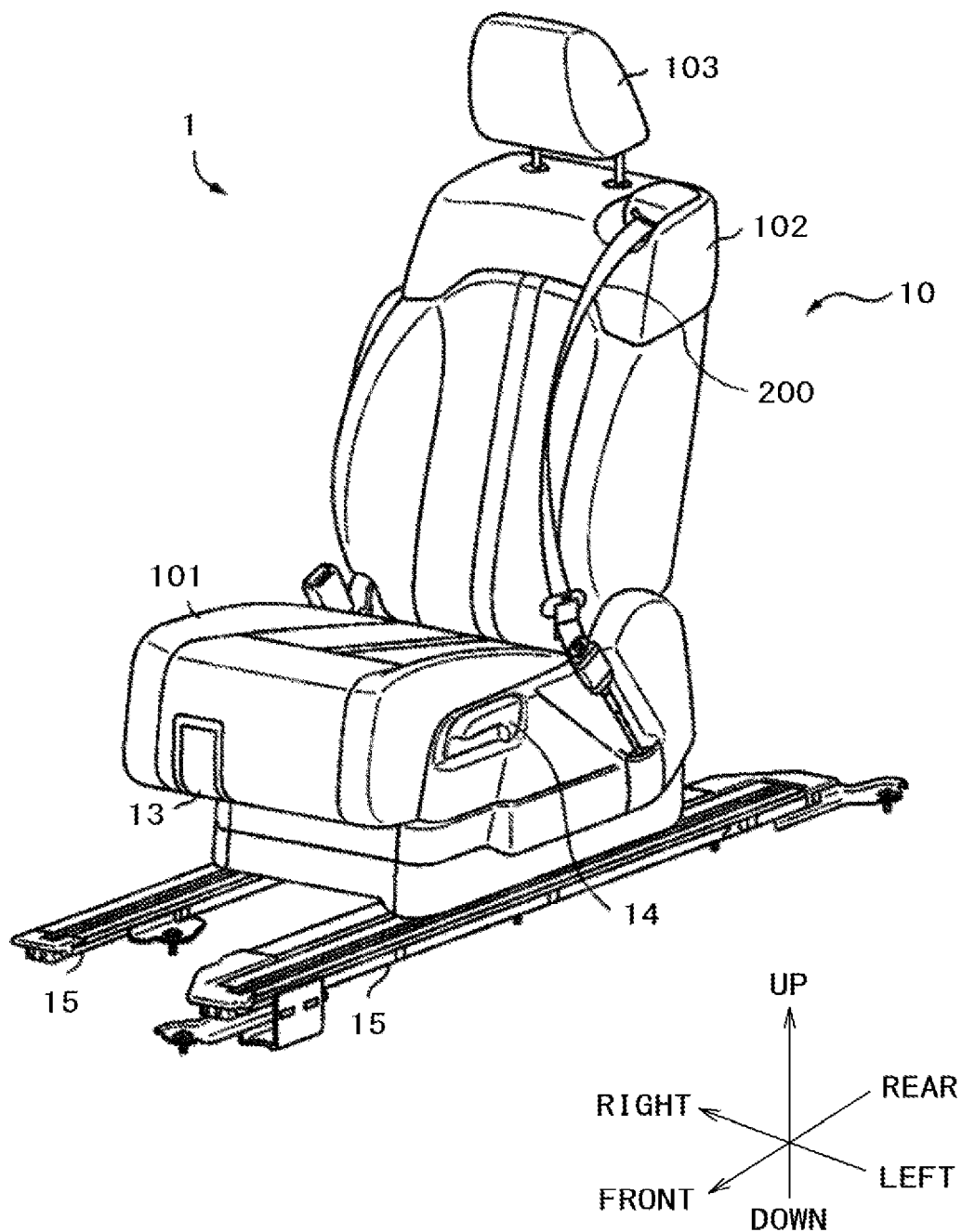
FIG. 1 is a perspective view of a vehicle seat 1 according to an embodiment when seen from a left front side of the seat.

An embodiment of the present invention will be described referring to the drawings.

The disclosure is a mere example of the present invention, and the drawings may illustrate the structure schematically with respect to width, thickness, shape and the like compared with the actual structure of the embodiment with no intention to interfere with interpretation of the present invention. Throughout the specification and the drawings, the same elements will be designated with the same codes, and repetitive explanations thereof in detail, thus may be omitted.

EMBODIMENT

Figure 2:
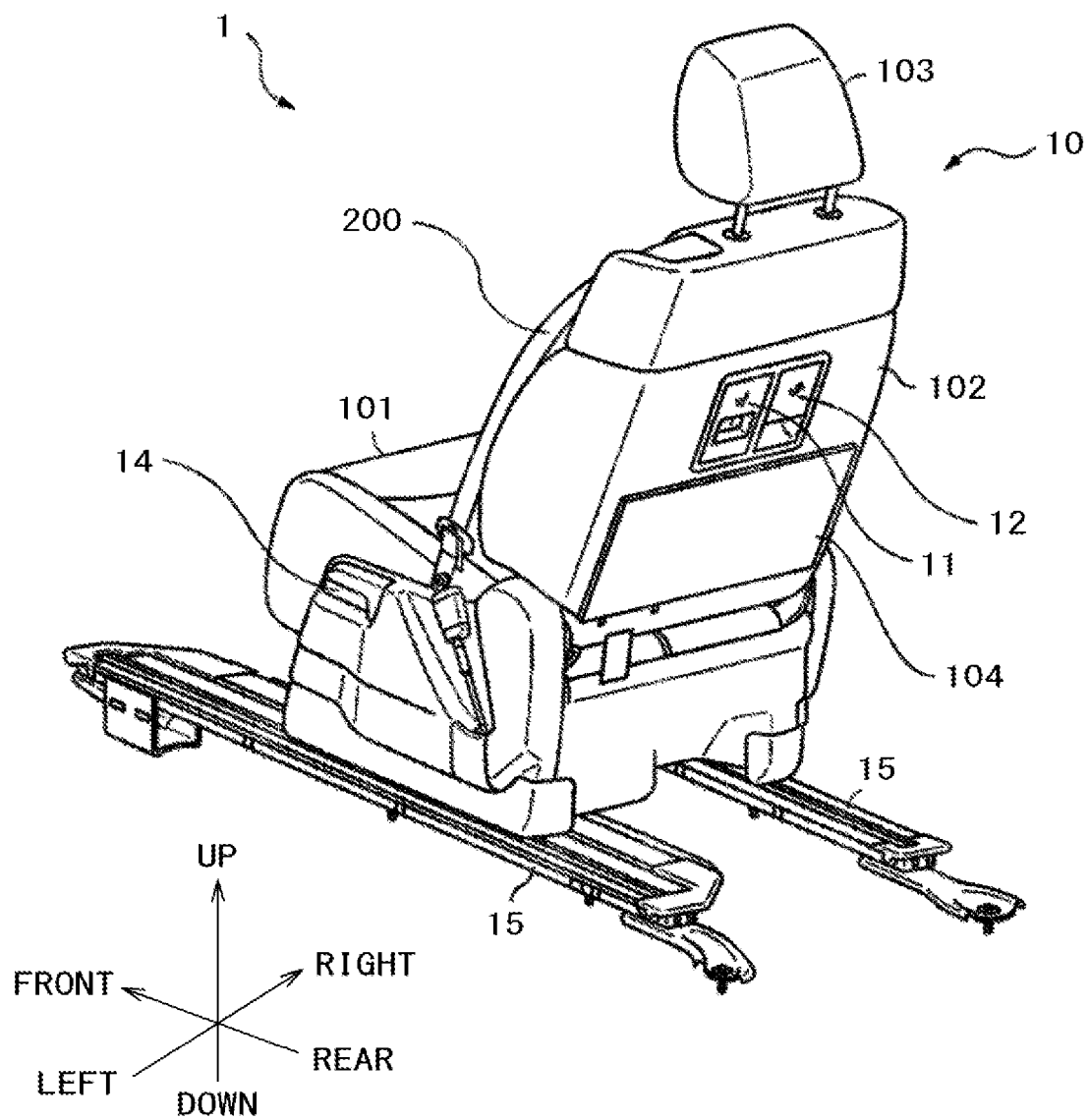
FIG. 2 is a perspective view of the vehicle seat 1 according to the embodiment when seen from a left rear side of the seat.

FIG. 1 is a perspective view of a vehicle seat 1 according to the embodiment when seen from the left front side. FIG. 2 is a perspective view of the vehicle seat 1 according to the embodiment when seen from the left rear side. The vehicle seat 1 may be exemplified as a front passenger seat, or as the other seat (driver's seat, rear passenger seat). The vehicle seat 1 includes a seat 10, operation sections 11, 12, 13, 14, and two rails 15. The seat 10 includes a seat cushion 101, a seat back 102, a head rest 103, and a seat belt 200. The seat cushion 101 constitutes the seat surface, and the seat back 102 constitutes the backrest. The head rest 103 is disposed above the seat back 102 for supporting a seated occupant's head. The seat belt 200 protects the seated occupant's body from impact caused by the vehicle collision. The seat 10 includes a sliding function that allows its positional adjustment in the front-to-rear direction, and a reclining function that allows adjustment of the angle formed between the seat cushion 101 and the seat back 102.

The operation sections 11 and 13 as levers are operated for sliding operations. Those sections are configured to receive sliding operations of the seat 10 in the front-to-rear direction. The seat 10 may be slidably operated either by the operation section 11 or 13. The two rails 15 are fixed to the vehicle, functioning as the guide for enabling the sliding operations of the seat 10 in the front-to-rear direction.

The operation sections 12 and 14 as levers are operated for reclining operations. Those sections are configured to receive reclining operations of the seat 10. The seat 10 may be reclined either by the operation section 12 or 14.

The operation sections 11 and 12 are horizontally or laterally arranged on the back surface of the seat 10, that is, rear side of the seat back 102, and either of which can be operated relatively easily. In this example, the operation sections 11 and 12 are arranged side by side below the head rest 103 in the width direction of the seat 10 so as to be readily operated by the user. A pocket 104 is provided at the lower part of the seat back 102 on its back surface so that the magazine or the like can be stored. The operation sections 11 and 12 are positioned above the pocket 104. The above-described layout of those operation sections 11 and 12, and the pocket 104 is handy for the user.

The operation section 13 is disposed at the front side of the seat 10, specifically, at the lower front side of the seat cushion 101 in this example so as to receive the sliding operations independently from the operation section 11. The operation section 14 is disposed at the side of the seat 10, specifically, at the left side of the seat cushion 101 in this example so as to receive the reclining operations independently from the operation section 12. In other words, the user is allowed to enable the sliding operations either by the operation section 11 or 13. The user is also allowed to enable the reclining operations either by the operation section 12 or 14.

The operation section 11 is disposed on the back surface of the seat 10, and the operation section 13 for imparting the same function as that of the operation section 11 is disposed at the front side of the seat 10. The user is capable of selecting more convenient operation section either 11 or 13 for sliding operations. Meanwhile, the operation section 12 is located at the side opposite the operation section 14 for actualizing the same function as the operation section 12 with respect to the operation section 11. The above-described arrangement allows the user to select more convenient operation section either 12 or 14 for reclining operations.

Marks are formed on the respective exposed surfaces of the operation sections 11 and 12 (specifically, areas that can be visually observed by the user in the state where the operation sections 11 and 12 are retracted in storage recesses, that is, a first storage recess 161 and a second storage recess 162, respectively). Those marks are formed so that the user can easily recognize the correlation between the operation sections 11, 12 and the levers for sliding operations and reclining operations.

Figure 3:
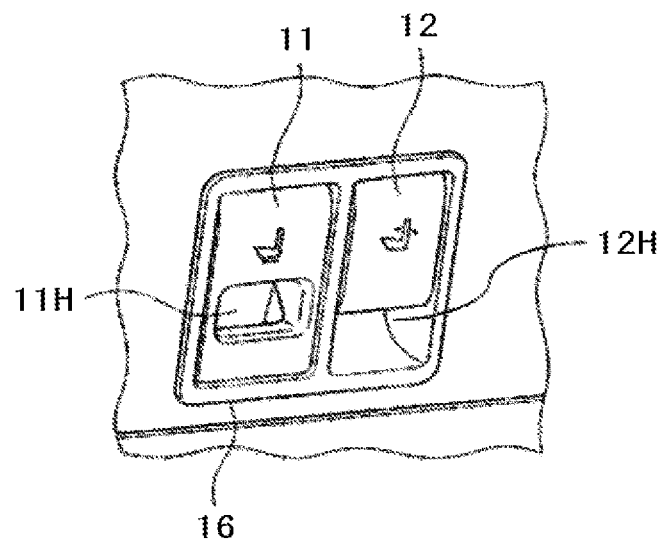
FIG. 3 is a perspective view of the state where operation sections 11 and 12 according to the embodiment are not operated.
Figure 4:
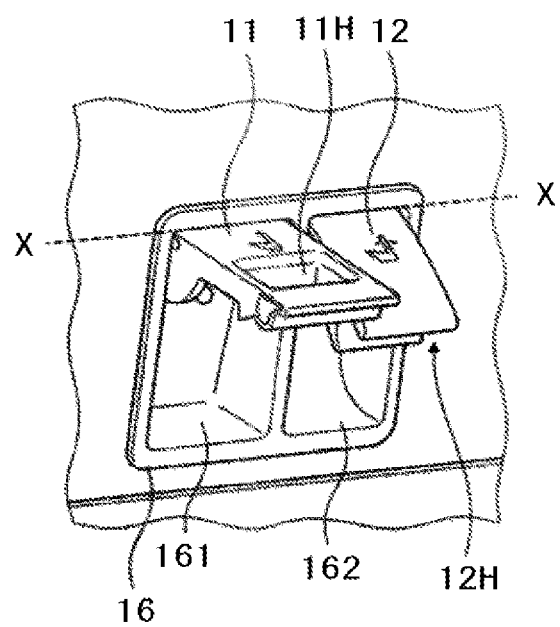
FIG. 4 is a perspective view of the state where the operation sections 11 and 12 according to the embodiment are operated.

FIG. 3 is a perspective view representing the state where the operation sections 11 and 12 according to the embodiment are not operated. FIG. 4 is a perspective view representing the state where the operation sections 11 and 12 according to the embodiment are operated. A mount frame 16 is attached to the back surface of the seat 10 (the surface at the rear side of the seat back 102). When the operation sections 11 and 12 are not operated (they are not operated by the user), they are retracted in the mount frame 16. The mount frame 16 includes the storage recesses 161 and 162 so that the operation sections 11 and 12 in non-operation states are retracted in those storage recesses 161 and 162, respectively.

In this example, each of the operation sections 11 and 12 is shaped differently from each other. It is possible for the user to recognize as to which operation section is used for which operation for sliding or reclining. The operation sections 11 and 12 are levers configured to be rotatable coaxially with an axis X. As described later, the axis X is formed as a single shaft member 40.

The operation section 11 may be formed as the lever having an opening 11H which allows insertion of the user's finger. The user raises the operation section 11 from the back surface of the seat 10 with respect to the axis X while having the finger inserted into the opening 11H so as to bring the seat 10 into the slidable state. In the state where the operation section 11 is held with the user's finger inserted into the opening 11H, the operation section 11 may be rotated and raised.

The operation section 12 may be formed as the lever having a recess 12H which allows insertion of the user's finger at the lower end. The user raises the operation section 12 from the back surface of the seat 10 with respect to the axis X while having the finger inserted into the recess 12H so as to bring the seat 10 into the reclinable state. Each of the opening 11H and the recess 12H may have the size which allows insertion of the user's finger.

In the embodiment, each of the storage recesses 161 and 162 has the same length in the direction intersecting the rotating axis (that is, vertical direction of the seat 10). Each of the operation sections 11 and 12 has the different length in the same direction as described above. This structure allows distinction between the operation sections 11 and 12.

Figure 5:
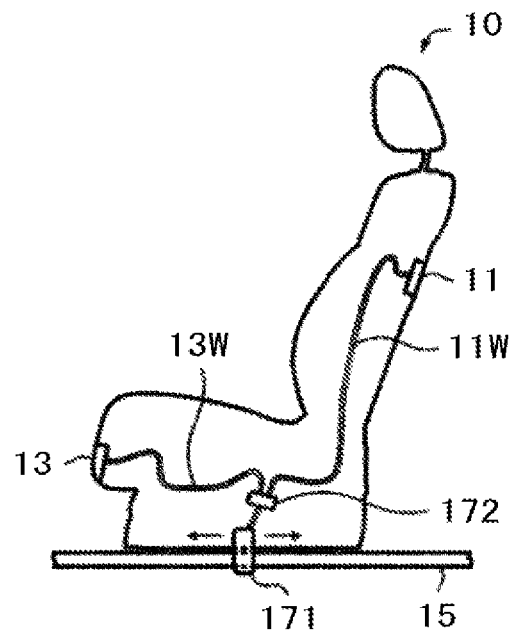
FIG. 5 is a schematic view explaining a structure of a sliding function of a seat 10.
Figure 6:
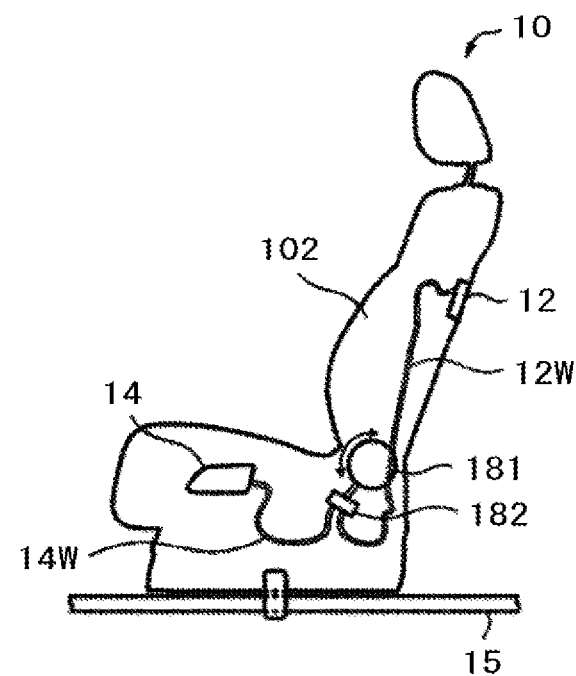
FIG. 6 is a schematic view explaining a structure of a reclining function of the seat 10.

FIG. 5 is a schematic view for explaining the configuration of the sliding function of the seat 10. FIG. 6 is a schematic view for explaining the configuration of the reclining function of the seat 10.

An explanation will be made with respect to the sliding function of the seat 10 referring to FIG. 5. The operation section 11 is disposed on the back surface of the seat 10, and the operation section 13 is disposed on the front side of the seat 10. The seat 10 includes rails 15 and a slidable slide mechanism 171 at its bottom, and a built-in lock/unlock mechanism 172 for locking and unlocking the slide mechanism 171. The operation sections 11 and 13 are connected to the lock/unlock mechanism 172 via wires 11W and 13W, respectively. For example, when the user rotates the operation section 11, the resultant tension force is transmitted to the lock/unlock mechanism 172 via the wire 11W so that the slide mechanism 171 is unlocked. This allows the slide mechanism 171 to be slidable along the rail 15 in arrowed directions. When the user returns the operation section 11 to the original state (retracted in the storage recess 161), the slide mechanism 171 is locked again. This applies to the case where the user operates the operation section 13.

An explanation will be made with respect to the reclining function of the seat 10 referring to FIG. 6. The operation section 12 is disposed on the back surface of the seat 10, and the operation section 14 is disposed at the side of the seat 10. The seat 10 includes a built-in reclining mechanism 181 and a built-in lock/unlock mechanism 182 for locking or unlocking the reclining mechanism. The operation sections 12 and 14 are connected to the lock/unlock mechanism 182 via the wires 12W and 14W, respectively. For example, when the user rotates the operation section 12, the resultant tension force is transmitted to the lock/unlock mechanism 182 via the wire 12W so as to unlock the reclining mechanism 181. This makes it possible to allow rotation of the seat back 102 of the seat 10 in the arrowed directions of the drawing. If the user returns the operation section 12 to the original state (retracted in the storage recess 162), the reclining mechanism 181 is locked again. This applies to the case where the user operates the operation section 14. Each of the sliding function and the reclining function may be mechanically configured or electrically configured using a motor or the like.

Structures of the operation sections 11, 12, and the mount frame 16 will be described referring to the drawings.

Figure 7:
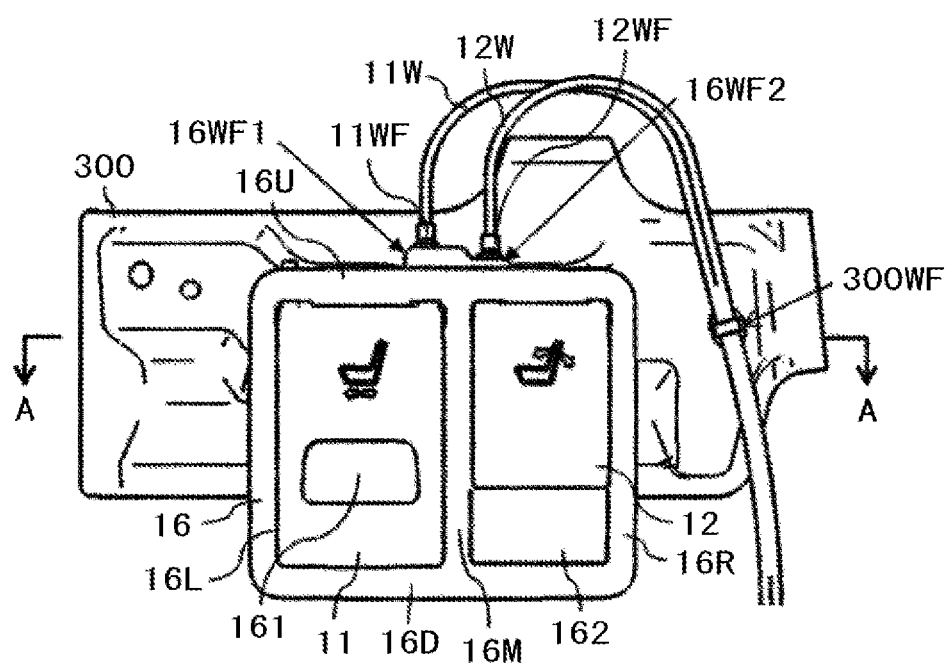
FIG. 7 is a view showing a structure for mounting a mount frame 16.

FIG. 7 is a view illustrating the structure for mounting the mount frame 16. The mount frame 16 assembled with the operation sections 11 and 12 is fixed to a mount frame 300 (hereinafter referred to as a frame) made from a metal material such as iron. The mount frame 300 may be formed as a mount member or a mount plate. The frame 300 is fixed to a not shown seat back frame or any other member such as a pipe that constitutes the seat back frame, which is disposed in the seat back 102. The mount frame 16 includes a wire fixing section 16WF1 with which a fixing section 11WF of the wire 11W is fitted, and a wire fixing section 16WF2 with which a fixing section 12WF of the wire 12W is fitted. The wire fixing sections 16WF1 and 16WF2 are horizontally arranged at substantially the center of the upper part of the mount frame 16. The wires 11W and 12W are fixed to the frame 300 with a wire fixing member 300WF.

The mount frame 16 includes an upper frame 16U, a lower frame 16D, a left frame 16L, a right frame 16R, and a middle frame 16M. The storage recess 161 of the mount frame 16 is formed in the region defined by the upper frame 16U, the lower frame 16D, the left frame 16L, and the middle frame 16M. The storage recess 162 of the mount frame 16 is formed in the region defined by the middle frame 16M, the upper frame 16U, the lower frame 16D, and the right frame 16R. The operation sections 11 and 12 are disposed in the storage recesses 161 and 162, respectively side by side while interposing the middle frame 16M.

Figure 8:
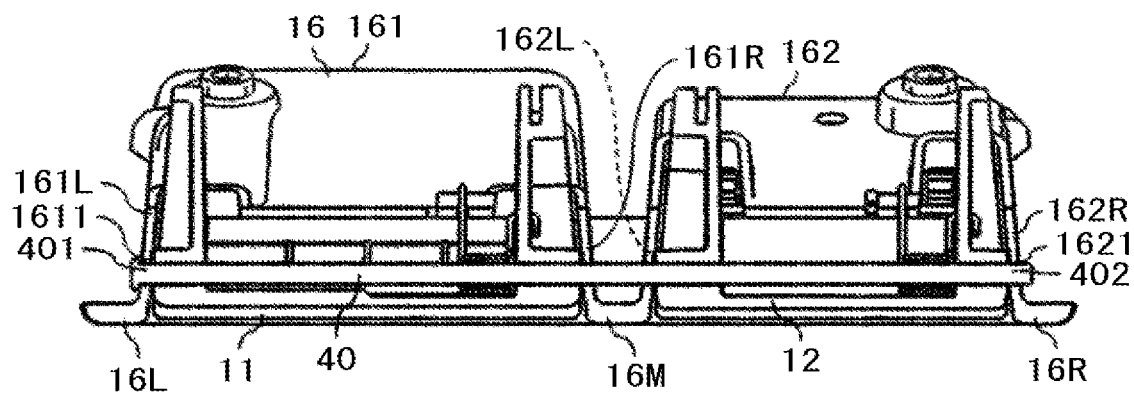
FIG. 8 is a sectional view taken along line A-A of FIG. 7 when seen downward from the line.

FIG. 8 is a sectional view of the structure taken along line A-A of FIG. 7 when seen downward from the line. The operation sections 11 and 12 are rotatably attached to the shaft member 40 constituted by a linear metal rod or a metal pin as a rotating axis (axis X as shown in FIG. 4). Referring to FIG. 8, a left end 401 and a right end 402 of the shaft member 40 are rotatably fixed to the bearing (first bearing) 1611 formed in a left surface 161L of the storage recess 161, and the bearing (second bearing) 1621 formed in a right surface 162R of the storage recess 162, respectively. In other words, the operation sections 11, 12 are arranged side by side between the bearings 1611 and 1621. Meanwhile, the shaft member 40 is not fixed to the right surface 161R of the storage recess 161 and a left surface 162L of the storage recess 162. That is, the right surface 161R of the storage recess 161 and the left surface 162L of the storage recess 162 do not have the fixing sections or bearings for the shaft member 40.

Although not shown, a first spring member is fixed between a spring fixing section of the operation section 11 and a spring fixing section of the mount frame 16 for returning the operation section 11 into the non-operation state from the operation state. Likewise, a second spring member is fixed between a spring fixing section of the operation section 12 and the spring fixing section of the mount frame 16 for returning the operation section 12 into the non-operation state from the operation state.

As FIGS. 7 and 8 show, the operation section 11 is made wider than the operation section 12. Furthermore, the storage recess 161 is made deeper than the storage recess 162. As the operation section 11 is differently shaped from the operation section 12, the user can easily distinguish between the operation sections 11 and 12.

An explanation will be made with respect to the structure of the mount frame 16 referring to FIGS. 9, 10, and 11A to 11D.

Figure 9:
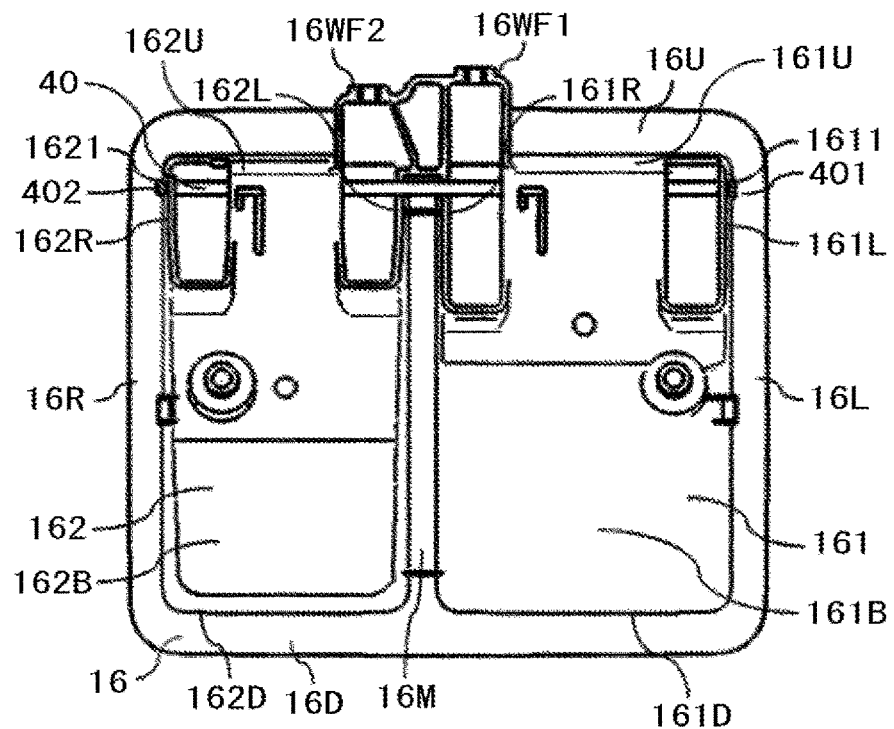
FIG. 9 is a back view of the mount frame 16 in the state where a shaft member 40 is attached.
Figure 10:
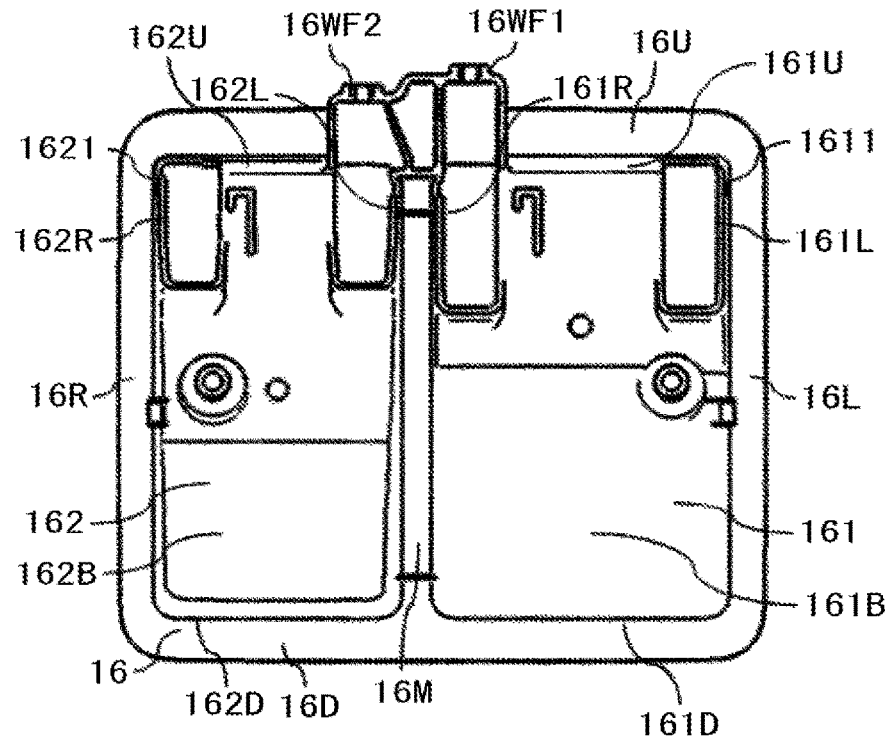
FIG. 10 is a back view of the mount frame 16 in the state where the shaft member 40 shown in FIG. 9 is removed.
Figure 11A:
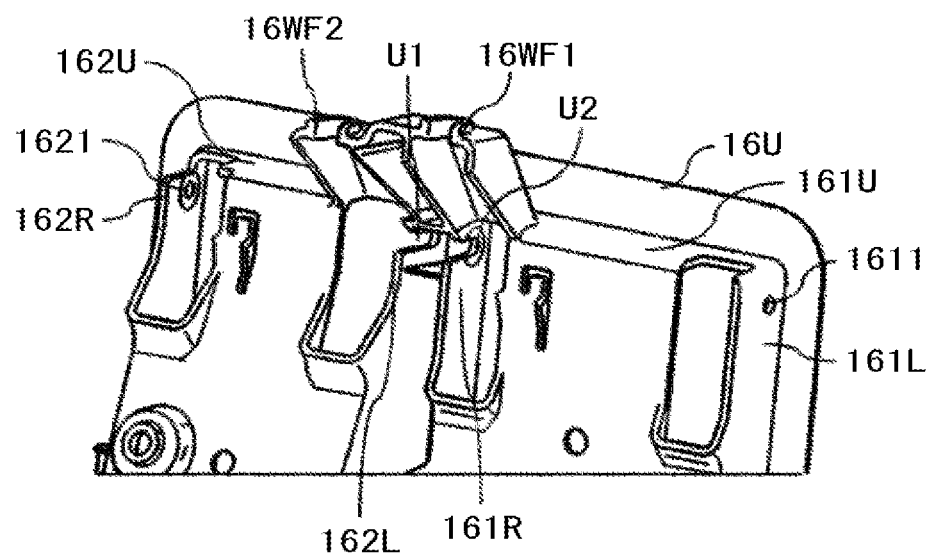
FIGS. 11A to 11D are perspective views of an enlarged upper section of the structure shown in FIG. 10. Specifically.
Figure 11B:
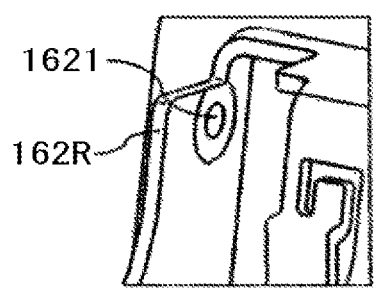
Figure 11C:
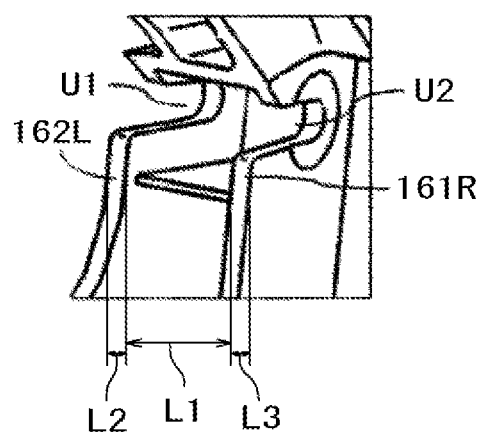
Figure 11D:
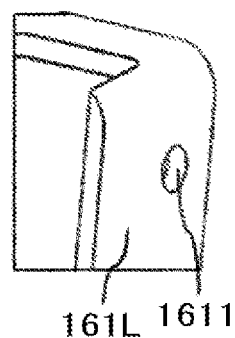

FIG. 9 is a view of the back surface of the mount frame 16 in the state where the shaft member 40 is attached. FIG. 10 is a view of the back surface of the mount frame 16 in the state where the shaft member 40 shown in FIG. 9 is removed. FIGS. 11A to 11D are perspective views illustrating an enlarged upper section of the structure as shown in FIG. 10. FIG. 11A is a perspective view illustrating the enlarged upper section as shown in FIG. 10. FIG. 11B is an enlarged view of the bearing 1621. FIG. 11C is an enlarged view of the right surface 161R and the left surface 162L. FIG. 11D is an enlarged view of the bearing 1611.

As FIGS. 9 and 10 show, the mount frame 16 includes the upper frame 16U, the lower frame 16D, the left frame 16L, the right frame 16R, and the middle frame 16M. The storage recess 161 of the mount frame 16 is formed in the region defined by the upper frame 16U, the lower frame 16D, the left frame 16L and the middle frame 16M. Meanwhile, the storage recess 162 of the mount frame 16 is formed in the region defined by the middle frame 16M, the upper frame 16U, the lower frame 16D, and the right frame 16R.

The storage recess 161 is constituted by the left surface 161L, the right surface 161R, an upper surface 161U, a lower surface 161D and a bottom 161B. Likewise, the storage recess 162 is constituted by the left surface 162L, the right surface 162R, an upper surface 162U, a lower surface 162D and a bottom 162B.

As FIGS. 9, 10 and 11A to 11D show, the left end 401 and the right end 402 of the shaft member 40 are rotatably fixed to the bearing 1611 formed in the left surface 161L of the storage recess 161, and the bearing 1621 formed in the right surface 162R of the storage recess 162, respectively. As FIGS. 11A, 11B, and 11D show, each of the bearings 1611 and 1621 is formed into a substantially circular opening.

Meanwhile, the shaft member 40 is not fixed to the right surface 161R of the storage recess 161 and the left surface 162L of the storage recess 162. Each of the right surface 161R of the storage recess 161 and the left surface 162L of the storage recess 162 has no fixing part or bearing for the shaft member 40. In other words, as FIG. 11C shows, the right surface 161R of the storage recess 161 and the left surface 162L of the storage recess 162 include U-like grooves U1 and U2, respectively, which allow passage of the shaft member 40 without being fixed. Each of the grooves U1 and U2 is configured to have an opening at the back surface side of the mount frame 16. The groove may be formed to have a U-like shape, a V-like shape, a channel shape, and the like. Therefore, the shaft member 40 may be attached to the mount frame 16 at the bearings 1611 and 1621, but is not fixed to the mount frame 16 in the region between the bearings 1611 and 1621.

Referring to FIG. 11C, a code L1 denotes the distance between the right surface 161R of the storage recess 161 and the left surface 162L of the storage recess 162. The distance L1 is set to approximately 12 mm. Codes L2 and L3 denote plate thicknesses of the right surface 161R of the storage recess 161, and the left surface 162L of the storage recess 162, respectively. Each of the codes L2 and L3 is set to approximately 2 mm. The width of the middle frame 16M is set to approximately 10 mm.

The mount frame 16 may be formed through the known injection molding process. For example, a thermosetting resin material is heated into a fluidity state, and injected under pressure into a hollow section (cavity) between the upper die and the lower die, which are closed so that the resin material is solidified in the die to form the mount frame.

The bearings 1611 and 1621 may be respectively formed into the circular opening by the use of the slide die. In view of the distance of approximately 12 mm between the right surface 161R of the storage recess 161 and the left surface 162L of the storage recess 162, it is structurally difficult for the slide die to form the circular openings each as the bearing for the shaft member 40 in the right surface 161R of the storage recess 161 and the left surface 162L of the storage recess 162, respectively. In order to form the circular bearings both in the right surface 161R of the storage recess 161 and the left surface 162L of the storage recess 162, the slide die with sliding amount of approximately 3 mm (1.5 times larger than the plate thickness of 2 mm), and the fixing die set to 15 mm are required. As a result, the width of the middle frame 16M is ranged from 30 mm or larger to 40 mm or smaller. Assuming that the width of the operation section 11 is set to approximately 100 mm, and the width of the operation section 12 is set to approximately 80 mm, the middle frame 16M having the width in the range from 30 mm or larger to 40 mm or smaller may fail to realize good appearance.

Instead of forming the circular openings as bearings in the right surface 161R of the storage recess 161, and the left surface 162L of the storage recess 162, the groove structures U1 and U2 are formed by the use of the generally employed die alternative to the slide die. The above-described groove structure makes it possible to reduce the distance between the right surface 161R of the storage recess 161 and the left surface 162L of the storage recess 162. Accordingly, the distance between the seat operation sections 11 and 12 arranged side by side may be reduced to make the entire arrangement area of the seat operation sections 11, 12 smaller relative to the back surface area of the seat back 102, thus improving the appearance. The entire arrangement area of the seat operation sections 11, 12 is determined by the upper frame 16U, the lower frame 16D, the left frame 16L, and the right frame 16R of the mount frame 16. Narrowing the width of the middle frame 16M ensures to make the entire arrangement area smaller.

The seat operation sections 11, 12 are attached to the mount frame 16 with the bearings 1611 and 1621, and the single shaft member 40. The above-described structure reduces the number of parts compared with the structure having the single shaft member attached to each of the seat operation sections 11, 12. This makes it possible to reduce manufacturing costs.

The present invention has been explained in detail based on the embodiment. It is to be understood that the present invention is not limited to the above-described embodiment and any other embodiment, but may be modified into various forms.

What is claimed is:

1. A vehicle seat comprising a seat cushion and a seat back, wherein:
the seat back includes a seat operation section disposed on a back surface of the seat back;
the seat operation section includes one shaft member, a mount frame having a first bearing and a second bearing, and a first operation section and a second operation section which are arranged side by side;
the shaft member is attached to the first bearing and the second bearing, having no fixing section for the mount frame between the first bearing and the second bearing, and serving as a center around which the first operation section and the second operation section are rotated; and
the mount frame includes a first storage recess in which the first operation section is disposed, and a second storage recess in which the second operation section is disposed.

2. The vehicle seat according to claim 1, wherein the first operation section and the second operation section are disposed between the first bearing and the second bearing.

3. The vehicle seat according to claim 2, wherein each of the first bearing and the second bearing is a circular opening formed in the mount frame.

4. The vehicle seat according to claim 3, wherein:
the first storage recess includes a left surface in which the first bearing is formed, and a right surface;
the second storage recess includes a left surface, and a right surface in which the second bearing is formed; and
each of the right surface of the first storage recess and the left surface of the second storage recess has a groove-like opening which allows passage of the shaft member.

5. A seat operation section disposed on a back surface of a seat back, wherein:
the seat operation section includes one shaft member, a mount frame having a first bearing and a second bearing, and a first operation section and a second operation section which are arranged side by side;
the shaft member is attached to the first bearing and the second bearing, having no fixing section for the mount frame between the first bearing and the second bearing, and serving as a center around which the first operation section and the second operation section are rotated; and
the mount frame includes a first storage recess in which the first operation section is disposed, and a second storage recess in which the second operation section is disposed.

6. The seat operation section according to claim 5, wherein the first operation section and the second operation section are disposed between the first bearing and the second bearing.

7. The seat operation section according to claim 6, wherein each of the first bearing and the second bearing is a circular opening formed in the mount frame.

8. The seat operation section according to claim 7, wherein:
the first storage recess includes a left surface in which the first bearing is formed, and a right surface;
the second storage recess includes a left surface, and a right surface in which the second bearing is formed; and
each of the right surface of the first storage recess and the left surface of the second storage recess has a groove-like opening which allows passage of the shaft member.

* * * * *